United States Patent [19]

Witzler

[11]  4,218,946
[45]  Aug. 26, 1980

[54] CUTTER ASSEMBLY FOR EAVESTROUGH-FORMING MACHINE

[76] Inventor: Horst Witzler, 1004 Haythorn Rd., Sherwood Park, Alberta, Canada

[21] Appl. No.: 885,395

[22] Filed: Mar. 10, 1978

[51] Int. Cl.³ ..................... B23D 23/00; B23D 15/04
[52] U.S. Cl. ........................................ 83/636; 83/644
[58] Field of Search .......................... 83/580, 636, 694

[56] References Cited

U.S. PATENT DOCUMENTS

| 2,555,069 | 5/1951 | Verney | 83/694 |
| 2,908,328 | 10/1959 | Robertson | 83/580 |
| 3,150,551 | 9/1964 | Spengler et al. | 83/694 X |
| 3,227,026 | 1/1966 | Werntz | 83/694 X |
| 3,393,595 | 7/1968 | Halverson et al. | 83/580 |

*Primary Examiner*—J. M. Meister
*Attorney, Agent, or Firm*—Ernest P. Johnson

[57] ABSTRACT

The guillotine on a conventional cutter assembly used in conjunction with an eavestrough-forming machine has been modified to produce compacted cut-offs and to prevent jamming of the cutter assembly.

A radius is formed in the upper end of each cutting edge of a V-shaped blade. In a preferred embodiment a second, more steeply inclined portion connected at its top end to the radius is provided along each cutting edge.

4 Claims, 8 Drawing Figures

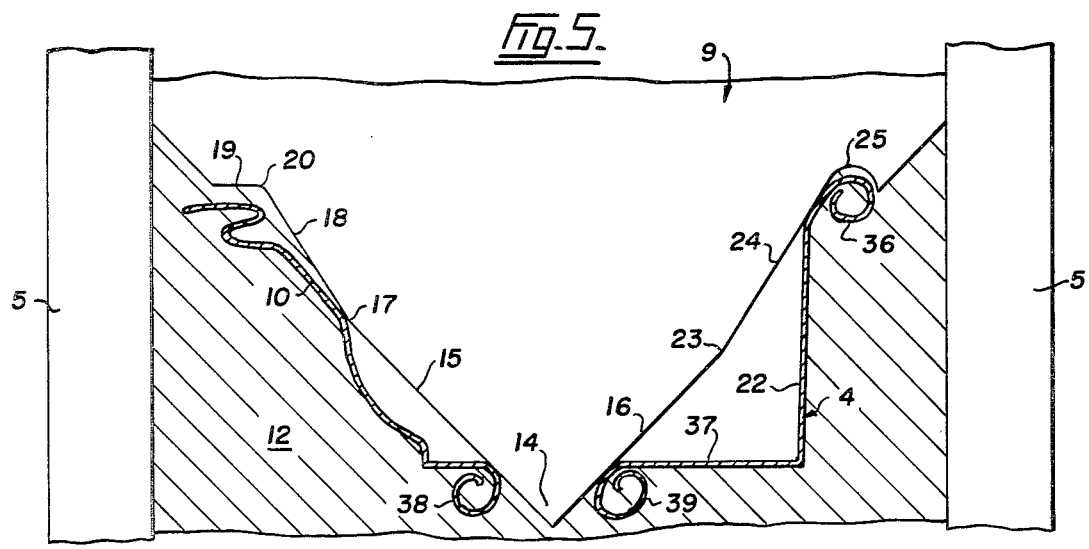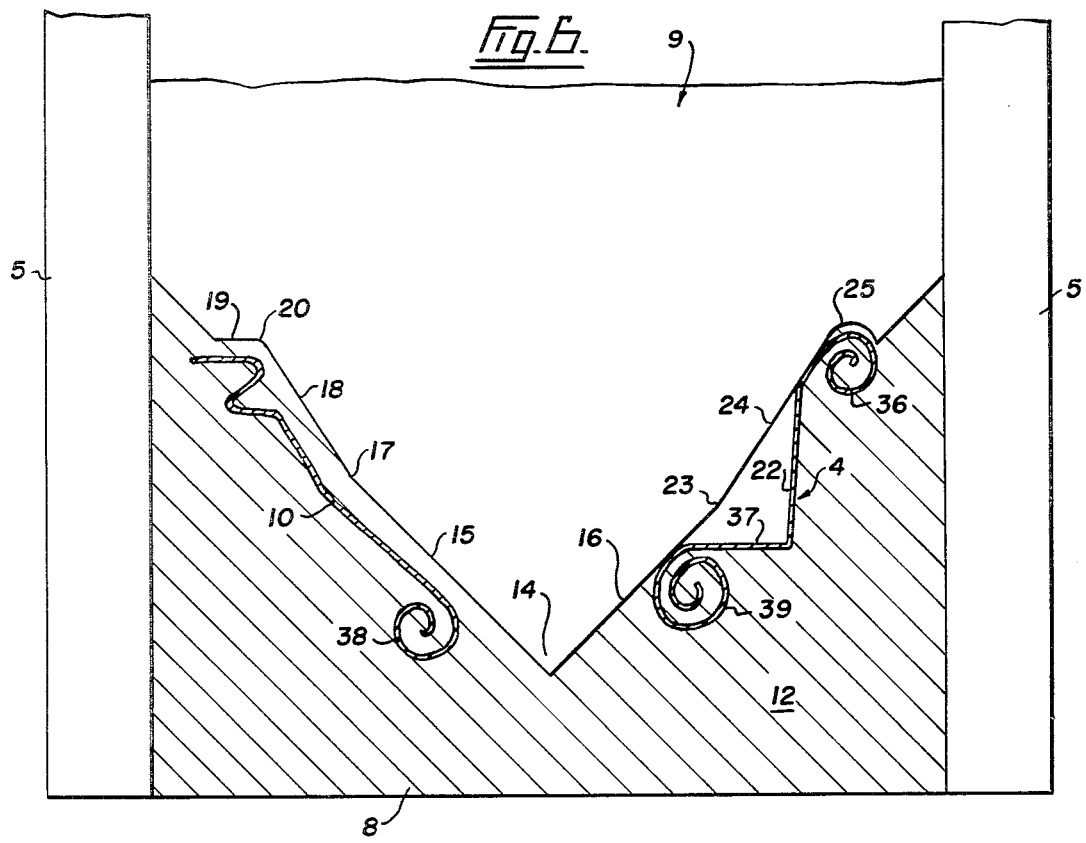

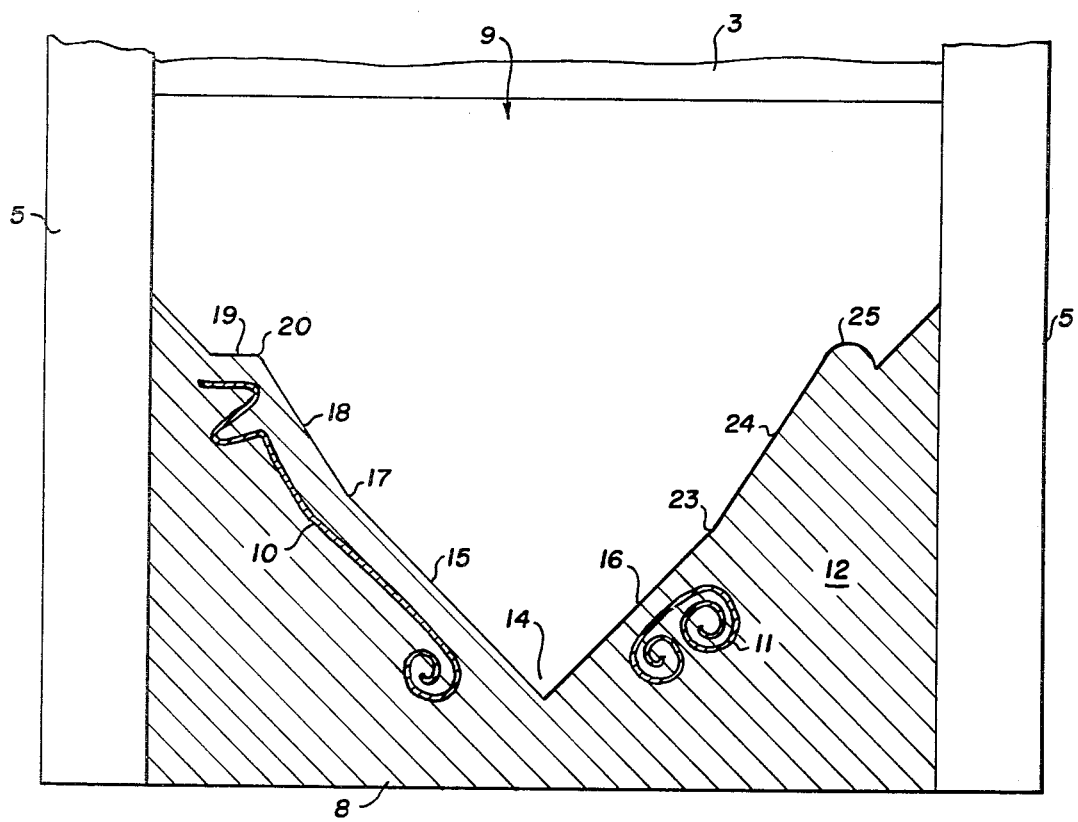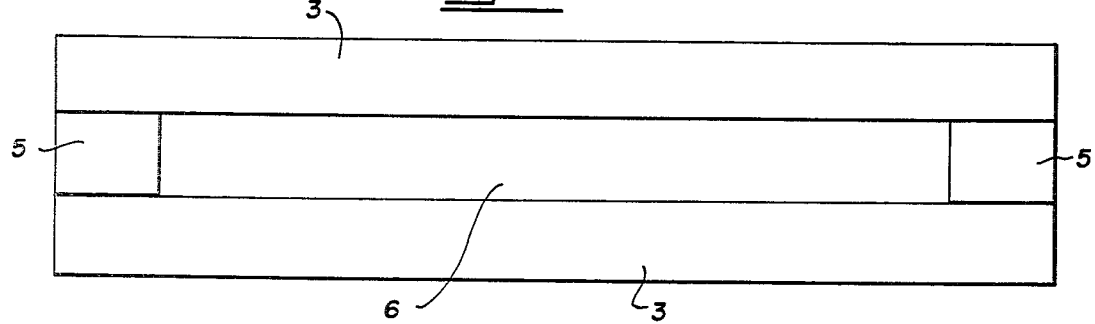

CUTTER ASSEMBLY FOR EAVESTROUGH-FORMING MACHINE

BACKGROUND OF THE INVENTION

This invention relates to an eavestrough cutter assembly having an improved guillotine.

It is now common to form eavestroughs at the use site from flat metal strips with a roller forming machine. These machines usually have a cutter assembly of the guillotine type at the discharge end for severing the product into desired lengths.

The existing cutter assemblies usually comprise two vertical support plates spaced from each other by a pair of guide plates. The four plates form an open-ended channel or path through which passes the guillotine. The support plates have matched apertures in the form of the shape of the eavestrough. The eavestrough to be severed is laid into the apertures and the V-shaped guillotine is moved downward by a manually operated linkage so as to shear through the eavestrough.

A problem with the existing cutter assemblies is that a substantial amount of pressure must be exerted by the operator throughout the cutting operation. This is in part due to the shape of the cutting blade. More particularly though, it has to do with the fact that the two strips, called cut-outs, removed by the stroke of the guillotine, tend to jam and accumulate in the channel and increasingly hamper the easy travel of the guillotine.

SUMMARY OF THE INVENTION

In accordance with the broadest form of the present invention a combination of two modifications has been introduced into the conventional cutter assembly to alleviate the jamming problem. Firstly, one or both of the support plates have been undercut in the region commencing immediately below the base of the aligned apertures and extending down to the bottom opening leading out of the assembly. By undercutting one or both of the support plates, the possibility for the side edges of the cut-outs to frictionally engage the support plate(s) is greatly reduced. Secondly, means are provided, at the upper end of each cutting edge of the guillotine, for forming the upper end of the relevant cut-out into a compact form, so that the length of the cut-out is less than if it were fully extended. Thus the upper ends of each cut-out no longer frictionally engage the surface of the adjacent spacer plate. Such means may comprise a radius or curve formed in the upper end portion of each cutting edge and which is operative to form the upper end of the cut-out into a compact configuration, e.g. a coil, so that it is spaced inwardly from the spacer plate.

In a preferred embodiment, the apex of the guillotine is formed by two converging cutting edges which are inclined 45° relative to the vertical. At a point part way up the first cutting edge which is to act on the front face of the eavestrough the angle of the cutting edge is changed to diminish the angle of the cutting edge relative to the vertical. The upper end of this more steeply inclined portion of the first cutting edge is connected to a substantially transverse edge through a radius. At a point part way up the second cutting edge which is to act on the back face of the eavestrough, the angle of the cutting edge, with respect to the vertical, is also diminished but to a lesser degree. This second, more steeply inclined portion ends in a downwardly directed radius at its upper end. In a most preferred embodiment, the lowermost portions of the first and second cutting edges are inclined at an angle of about 45° relative to the vertical; the upper portion of the first cutting edge is inclined at approximately 62° relative to the vertical and the upper portion of the second cutting edge is inclined at approximately 57° relative to the vertical. The above configuration of the cutting edges causes the upper end of the front cut-out to be folded and compressed and the upper end of the rear cut-out to be coiled, with the result that the cut-outs move over the lands of the support plates into the under-cut area through which they can fall freely without spreading outwardly to to the spacer plates.

Broadly stated, a cutter assembly for an eavestrough-forming machine is provided comprising a pair of support plates, each plate forming an aperture having a shape matching that of an eavestrough formed by the machine, said apertures being aligned in spaced relationship so that such eavestrough may extend therethrough and be supported by said plates; means for spacing the support plates apart, said spacing means cooperating with the support plates to form a channel having a bottom opening spaced below the apertures for the discharge of cut-outs, said spacing means forming a guillotine path extending across the apertures toward the bottom opening; a guillotine positioned between the plates and adapted to be moved along the path to remove cut-outs from an eavestrough extending through the apertures, said guillotine having a generally V-shaped blade providing first and second inclined cutting edges for severing the eavestrough; at least one of the support plates being undercut from immediately below its aperture to the bottom opening so that the cut-outs removed by the guillotine may drop freely through said opening without significant frictional contact with the plates; and said guillotine having means formed in the upper end portion of each cutting edge for forming the upper end of the cut-out removed by the relevant cutting edge into a compact configuration so that the length of the cut-out is less than its fully extended straight length, whereby the upper end of said cut-out is not in frictional contact with the spacing means.

DESCRIPTION OF THE DRAWINGS

In the drawings:

FIGS. 5 and 6 are side views with a support plate removed showing the continued advance of the cutting edge through the eavestrough and the accompanying compacting of the cut-outs;

FIG. 7 is a side view with a support plate removed showing the guillotine and the resulting cut-outs after total shearing of the eavestrough; and FIG. 8 is a top plan view showing the support plates and spacer plates defining a channel.

PREFERRED EMBODIMENT OF THE INVENTION

Figure 1:
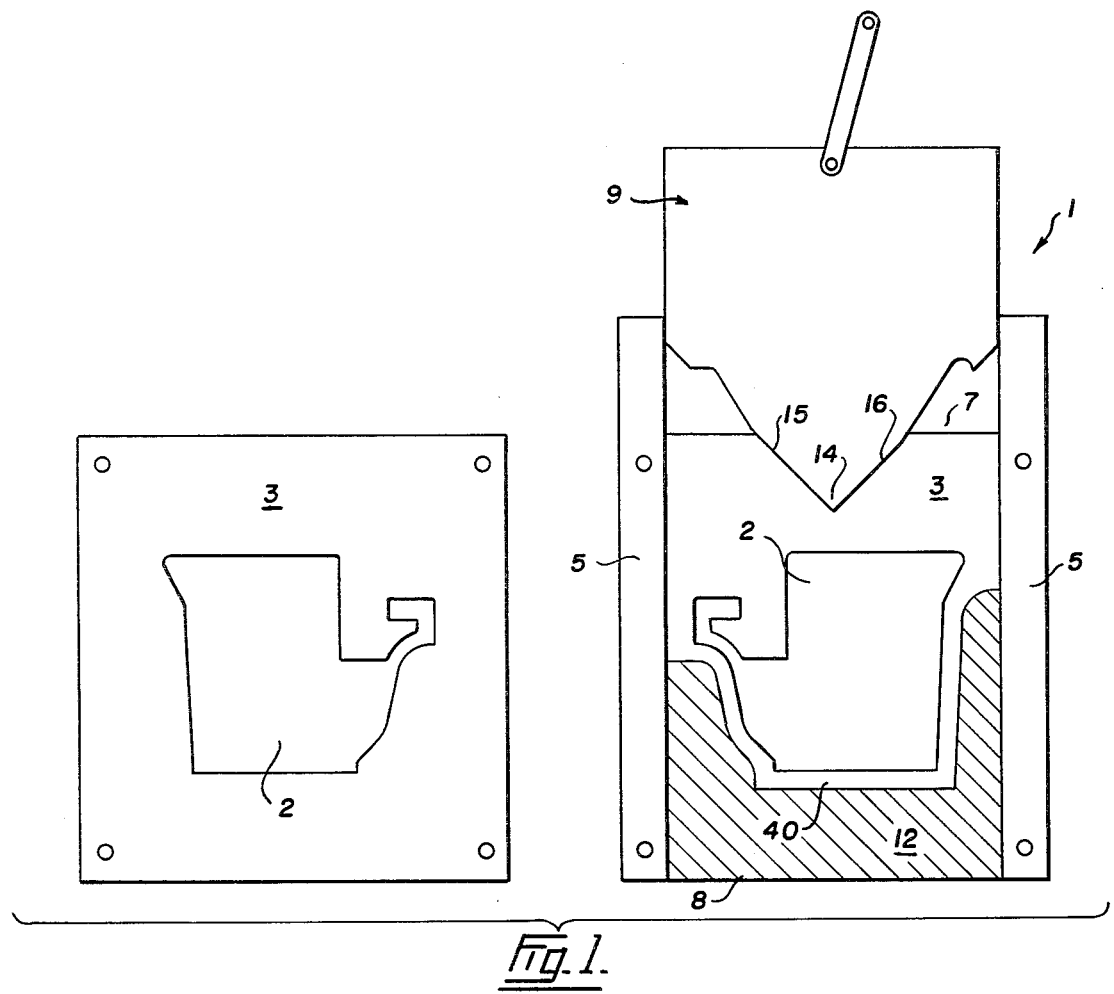
FIG. 1 is a side view illustration of the cutter assembly with one of the support plates removed to the side to show the inside channel of the cutter assembly.

An eavestrough cutter assembly 1 as provided by the present invention is shown in FIG. 1.

Matched apertures 2 in two support plates 3 are formed in the shape of an eavestrough. When the support plates are assembled, the apertures are aligned so that an eavestrough 4 may extend therethrough.

The support plates are spaced apart by spacer plates 5 and combine therewith to form a rectangular open-ended channel 6 having top and bottom openings 7, 8. A guillotine 9 travels in the channel and is guided across the apertures in the support plates by the spacer plates. Cut-outs 10, 11 from the sheared eavestrough can fall through the bottom opening.

At least one of the support plates is undercut as shown by the shaded area 12 from immediately below its aperture to the bottom opening so that the cut-outs removed from the eavestrough may drop freely through the bottom opening without its side edges frictionally engaging with the plates to any significant extent.

Figure 2:
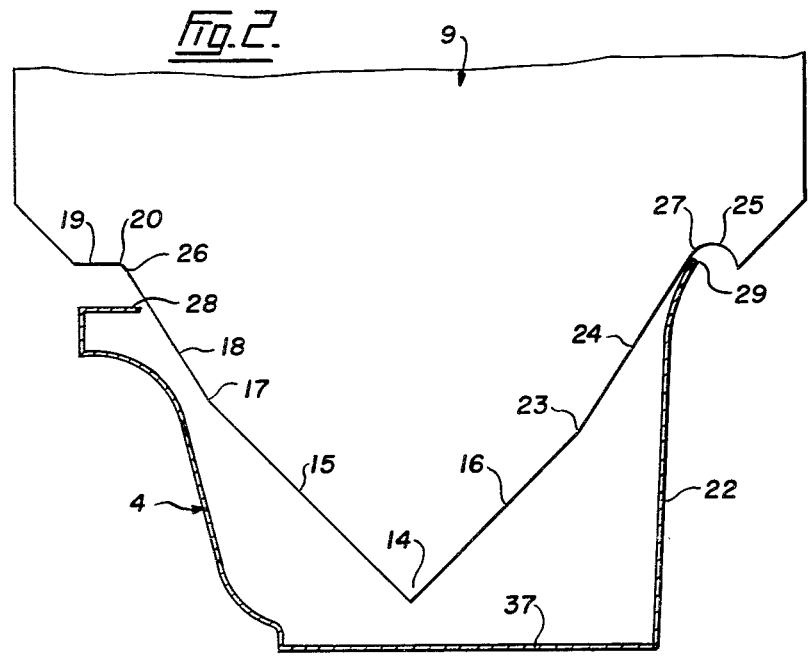
FIG. 2 is a side view of the guillotine and gives the angles relative to the vertical of the cutting edges of a preferred embodiment of the cutting blade.
Figure 3:
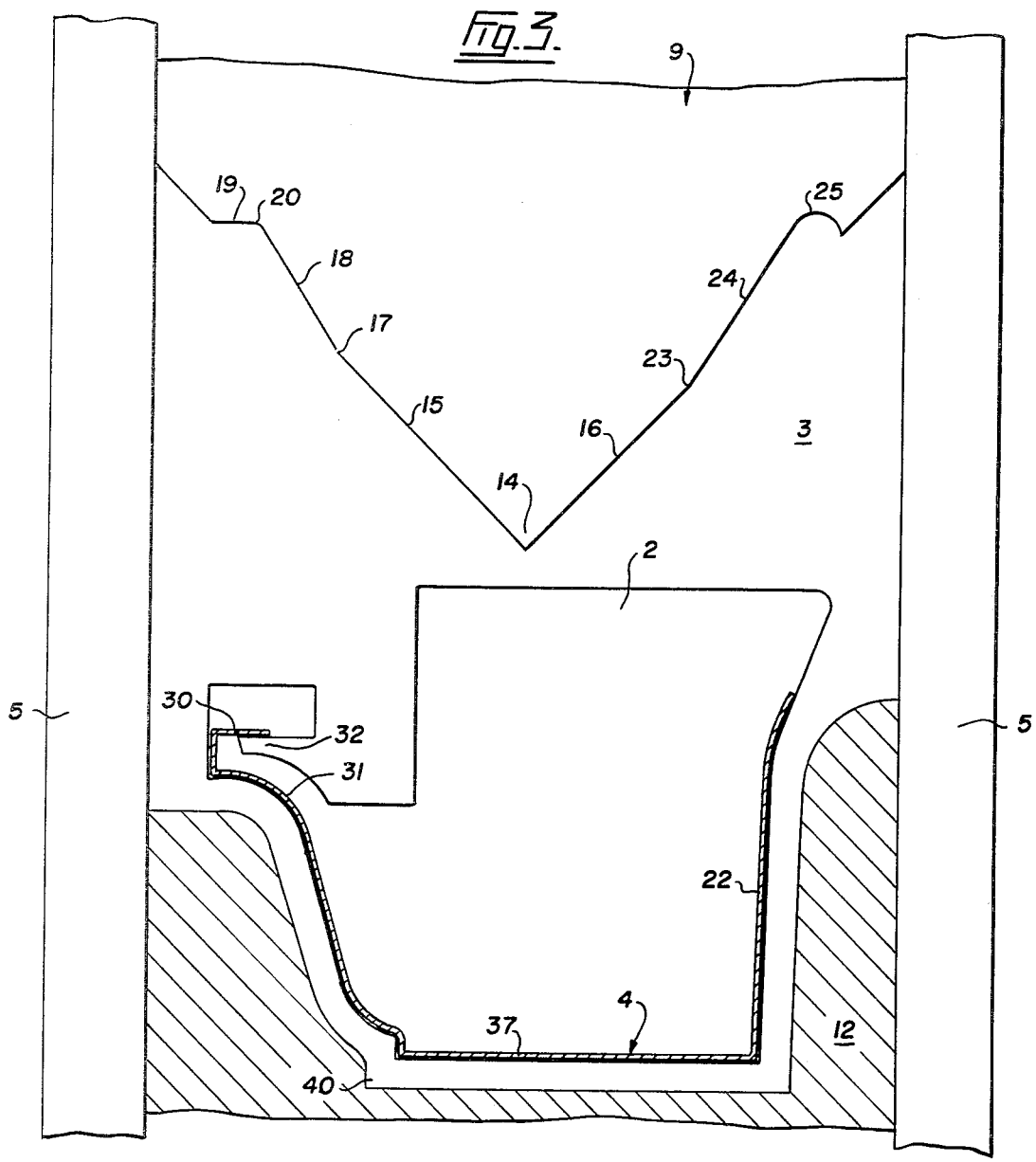
FIG. 3 is a side view illustration of one support plate, shaded to show the undercut, with an eavestrough laid in place and the guillotine in the upraised position.
Figure 4:
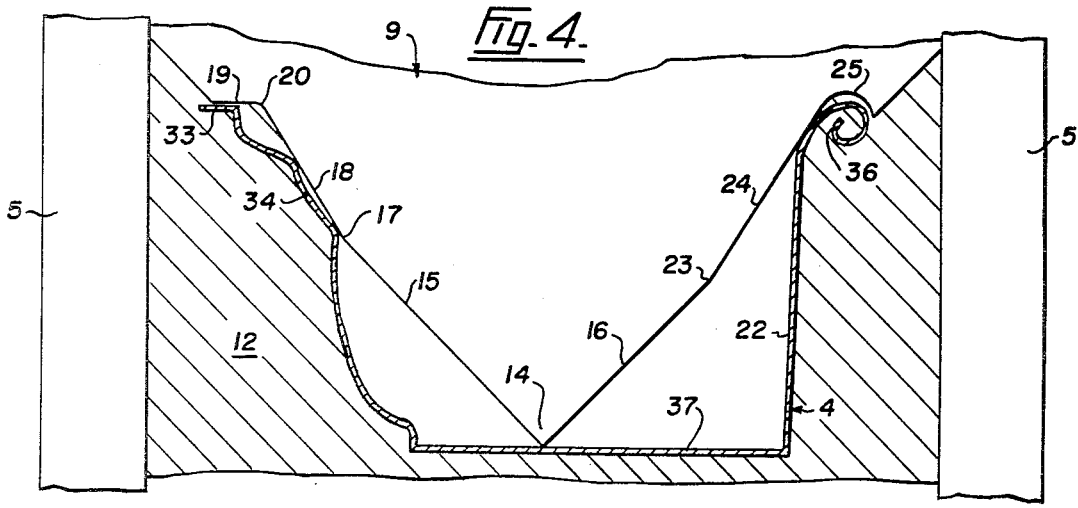
FIG. 4 is a side view with a support plate removed showing the cutting and forming action of the guillotine as it shears into the top edges of the eavestrough.

A guillotine 9 is provided having an apex 14 formed by two converging cutting edges 15, 16 inclined at 45° relative to the vertical. In a preferred embodiment, the first cutting edge 15 which acts on the front face of the eavestrough is more sharply inclined towards the vertical at a point 17 about halfway along the cutting edge. At its upper end, the more steeply inclined portion 18 connects to a substantially transverse or horizontal cutting edge 19 through a radius or curved face 20. The cutting edge 21 which cuts into the rear face 22 of the eavestrough also undergoes an inclining towards the vertical, but of lesser degree, at a point 23 approximately halfway along the cutting edge. This second, more steeply inclined portion 24 terminates in a downwardly directed radius 25. The preferred angles for the portions of the cutting edges are shown in FIG. 2.

The cutting action of the guillotine is now described. The points 26, 27 on the guillotine initially contact points 28, 29 respectively on the eavestrough. As the guillotine cuts through the upper, inwardly directed lip 30 of the eavestrough, the first cutting edge 15 pushes the loose end of the cut-out 10 outwardly. Once the first cutting edge 15 has cut through approximately half of the lip 30 and the radius 20 has come into contact with the eavestrough, point 17 of changing inclination on said cutting edge begins to interact with the radius 31 of the eavestrough. As the guillotine advances downwardly, the remainder of the lip is sheared by the transverse portion 19 of the first cutting edge, which pins the lip 30 against the noses 32 of the support plates. The loose top end 33 of the cut-out 10 is compressed by the downward movement of the transverse portion 19 and is pushed into the undercut area 12 where it is freed from frictional contact with the support plates. Section 34 of the cut-out 10 formed along the radius 31, is pushed outwardly and parallel to the steeply inclined portion 18 of the first cutting edge. Meanwhile, the more steeply inclined portion 24 and the radius 25 of the second cutting edge 21 cut through the back wall 22 of the eavestrough and cause the loose end 36 of the rear cut-out 11 to coil. In this manner the cut-out 11 is prevented from spreading into frictional contact with the right hand spacer plate. In addition, the undercut area 12 insures that the cut-out 11 can drop freely through the opening between the support plates. As the guillotine advances further, the apex 14 pierces through the bottom 37 of the eavestrough. The newly formed loose ends 38, 39 of the cut-outs 10, 11 coil as the apex of the guillotine shears through the bottom of the eavestrough. Simultaneously, the top lip 30 of the eavestrough is being sheared and the upper end of the cut-out 10 is compressed by the transverse portion 19 of the cutting edge 15 as it moves downwardly. Cutting edges 15, 16 then proceed to cut through the front and back walls of the eavestrough respectively until the front wall is completely sheared. The resulting cut-out 10 is pushed outwardly over the land 38 of the support plates, into the undercut area 12 where it falls freely between the support plates. The guillotine must continue downwardly to completely shear through the back wall and free the second cut-out 11.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. A cutter assembly for an eavestrough-forming machine, said assembly comprising:

a pair of support plates, each plate forming an aperture having a shape matching that of an eavestrough formed by the machine, said apertures being aligned in spaced relationship so that such eavestrough may extend therethrough and be supported by said plates;

means for spacing the support plates apart, said spacing means cooperating with the support plates to form a channel having a bottom opening spaced below the apertures for the discharge of cut-outs, said spacing means forming a guillotine path extending across the apertures toward the bottom opening;

a guillotine positioned between the plates and adapted to be moved along the path to remove cut-outs from an eavestrough extending through the apertures, said guillotine having a generally V-shaped blade providing first and second inclined cutting edges for severing the eavestrough;

at least one of the support plates being undercut from immediately below its aperture to the bottom opening so that the cut-outs removed by the guillotine may drop freely through said opening without significant frictional contact with the plates;

said guillotine having a radius formed in the upper end portion of each cutting edge for forming the upper end of the cut-out removed by the relevant cutting edge into a compact configuration so that the length of the cut-out is less than its fully extended straight length, whereby the upper end of said cut-out is not in frictional contact with the spacing means; and said V-shaped blade having a second more steeply inclined portion along each cutting edge, the second inclined portion being connected at its top edge to said radius formed in the upper end portion of each cutting edge.

2. A cutter assembly for an eavestrough-forming machine as set forth in claim 1 in which the radius on the first cutting edge is connected at its top end to a substantially transverse portion on the cutting edge.

3. A cutter assembly for an eavestrough-forming machine as set forth in claim 2 in which the radius on the second cutting edge is downwardly directed.

4. A cutter assembly for an eavestrough-forming machine as set forth in claim 3 in which the radius on the first cutting edge is tangential at its top end to a transverse portion and at its lower end to the second, more steeply, inclined portion of the cutting edge.

* * * * *